United States Patent
Kozuka

(10) Patent No.: US 6,538,693 B1
(45) Date of Patent: *Mar. 25, 2003

(54) PHOTOELECTRIC CONVERSION APPARATUS HAVING RESET NOISE HOLDING AND REMOVING UNITS

(75) Inventor: Hiraku Kozuka, Hiratsuka (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/786,183

(22) Filed: Jan. 21, 1997

(30) Foreign Application Priority Data

Jan. 24, 1996 (JP) .............................. 8-010336

(51) Int. Cl.[7] .............................. H04N 5/217
(52) U.S. Cl. ................... 348/241; 348/250; 348/302
(58) Field of Search ................. 348/241, 250, 348/302, 304, 308

(56) References Cited

U.S. PATENT DOCUMENTS

| | | |
|---|---|---|
| 3,781,574 A | 12/1973 | White et al. |
| 3,904,818 A | 9/1975 | Kovac |
| 4,145,721 A | 3/1979 | Beaudouin et al. |
| 4,216,503 A | 8/1980 | Wiggins |
| 4,293,877 A | 10/1981 | Tsunekawa et al. |
| 4,300,163 A | 11/1981 | Wada et al. |
| 4,380,755 A | 4/1983 | Endlicher et al. |
| 4,392,157 A | 7/1983 | Garcia et al. |
| 4,463,383 A | 7/1984 | Soneda et al. |
| 4,511,804 A | 4/1985 | Ozawa |
| 4,518,863 A | 5/1985 | Kokuoka et al. |
| 4,571,624 A | 2/1986 | Nishizawa et al. |
| 4,573,077 A | 2/1986 | Imai |

(List continued on next page.)

FOREIGN PATENT DOCUMENTS

| | | |
|---|---|---|
| DE | 3049130 A1 | 7/1982 |
| EP | 0027881 | 5/1981 |
| EP | 0078038 | 5/1983 |
| EP | 0082035 | 6/1983 |
| EP | 0108308 | 5/1984 |
| FR | 2551917 | 9/1984 |
| GB | 2071959 A | 9/1981 |
| JP | 53 078112 | 7/1978 |

(List continued on next page.)

OTHER PUBLICATIONS

Shin Kikuchi and Yoshio Koide, "High Speed, High Gradation Contact Type Linear Image Sensor BASIS Multi–Chip Sensor", Institute of Television Engineers of Japan, vol. 47, No. 9, p. 1180 (1993), with English translation.*

"100 X 100 CID Imager With Intergrated Fixed Pattern Noise Suppression," by Koch and Herbst, 1979, pp. 92–97.

Primary Examiner—Tuan Ho
(74) Attorney, Agent, or Firm—Fitzpatrick, Cella, Harper & Scinto

(57) ABSTRACT

In a one-dimensional or two-dimensional photoelectric converting apparatus for simultaneously executing an accumulation of a photosignal and an output of a signal, in order to remove a reset noise of a sensor unit and to reduce a random noise, the apparatus has a photosensor, a resetting circuit of the photosensor, noise signal holding elements for holding a noise signal when a resetting operation of the photosensor is executed, and a noise signal removing circuit for removing a noise from the signal accumulated in the photosensor after completion of the same resetting operation by using the noise signal held.

44 Claims, 12 Drawing Sheets

U.S. PATENT DOCUMENTS

| | | | |
|---|---|---|---|
| 4,583,108 A | | 4/1986 | Sireix |
| 4,644,287 A | * | 2/1987 | Levine .................. 348/241 |
| 4,678,938 A | | 7/1987 | Nakamura |
| 4,686,554 A | | 8/1987 | Ohmi et al. |
| 4,742,392 A | | 5/1988 | Hashimoto |
| 4,768,085 A | | 8/1988 | Hashimoto |
| 4,831,454 A | | 5/1989 | Tanaka et al. |
| 4,847,668 A | | 7/1989 | Sugawa et al. |
| 4,914,519 A | | 4/1990 | Hashimoto et al. |
| 5,019,602 A | | 5/1991 | Lowe |
| 5,276,521 A | * | 1/1994 | Mori ..................... 348/297 |
| 5,296,696 A | * | 3/1994 | Uno ...................... 348/246 |
| 5,311,320 A | | 5/1994 | Hashimoto |
| 5,331,421 A | * | 7/1994 | Ohzu et al. ............ 348/262 |
| 5,471,515 A | * | 11/1995 | Fossum et al. ........... 377/60 |
| 5,473,660 A | * | 12/1995 | Bastiaens et al. ....... 348/241 |
| 5,608,243 A | * | 3/1997 | Chi et al. .............. 257/249 |
| 5,631,704 A | * | 5/1997 | Dickinson et al. ...... 348/308 |
| 5,737,016 A | | 4/1998 | Ohzu et al. |
| 5,771,070 A | | 6/1998 | Ohzu et al. |
| 5,835,141 A | * | 11/1998 | Ackland et al. ........ 348/308 |
| 5,841,126 A | * | 11/1998 | Fossum et al. ......... 348/308 |
| 5,949,483 A | * | 9/1999 | Fossum et al. ......... 348/303 |

FOREIGN PATENT DOCUMENTS

| | | |
|---|---|---|
| JP | 55 044226 | 3/1980 |
| JP | 55 068879 | 5/1980 |
| JP | 55104174 | 8/1980 |
| JP | 56 046374 | 4/1981 |
| JP | 57 41081 | 3/1982 |
| JP | 57140073 | 8/1982 |
| JP | 58111579 | 7/1983 |
| JP | 59 023765 | 2/1984 |
| JP | 59 15167 | 5/1984 |
| JP | 59 144169 | 8/1984 |
| JP | 60 12759 | 1/1985 |
| JP | 60 12760 | 1/1985 |
| JP | 60 12761 | 1/1985 |
| JP | 60 12762 | 1/1985 |
| JP | 60 12763 | 1/1985 |
| JP | 60 12764 | 1/1985 |
| JP | 60 12765 | 1/1985 |
| JP | 60 100886 | 6/1985 |
| JP | 60 220674 | 11/1985 |
| JP | 61219666 | 9/1986 |
| JP | 62 185471 | 8/1987 |
| JP | 1154678 | 6/1989 |

* cited by examiner

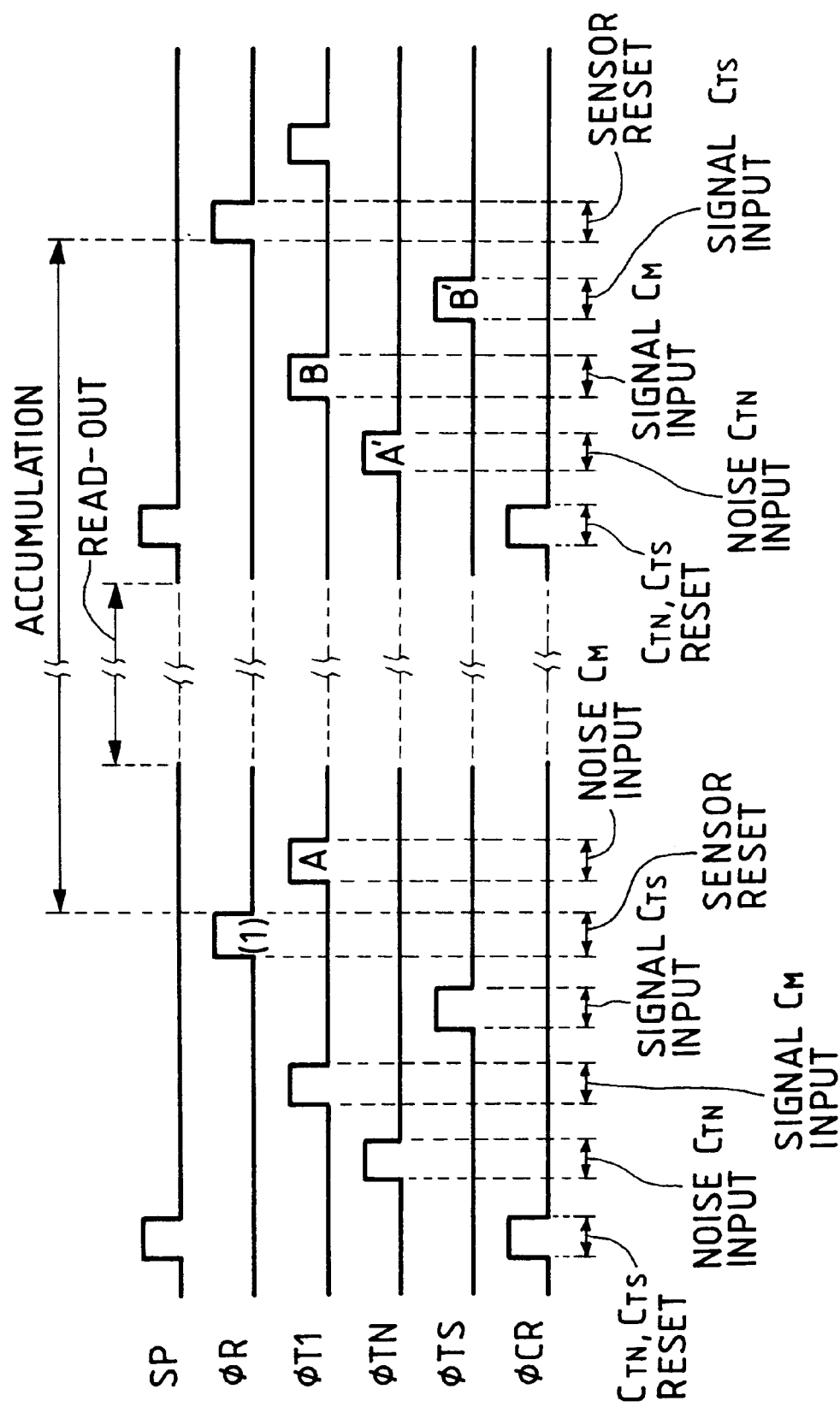

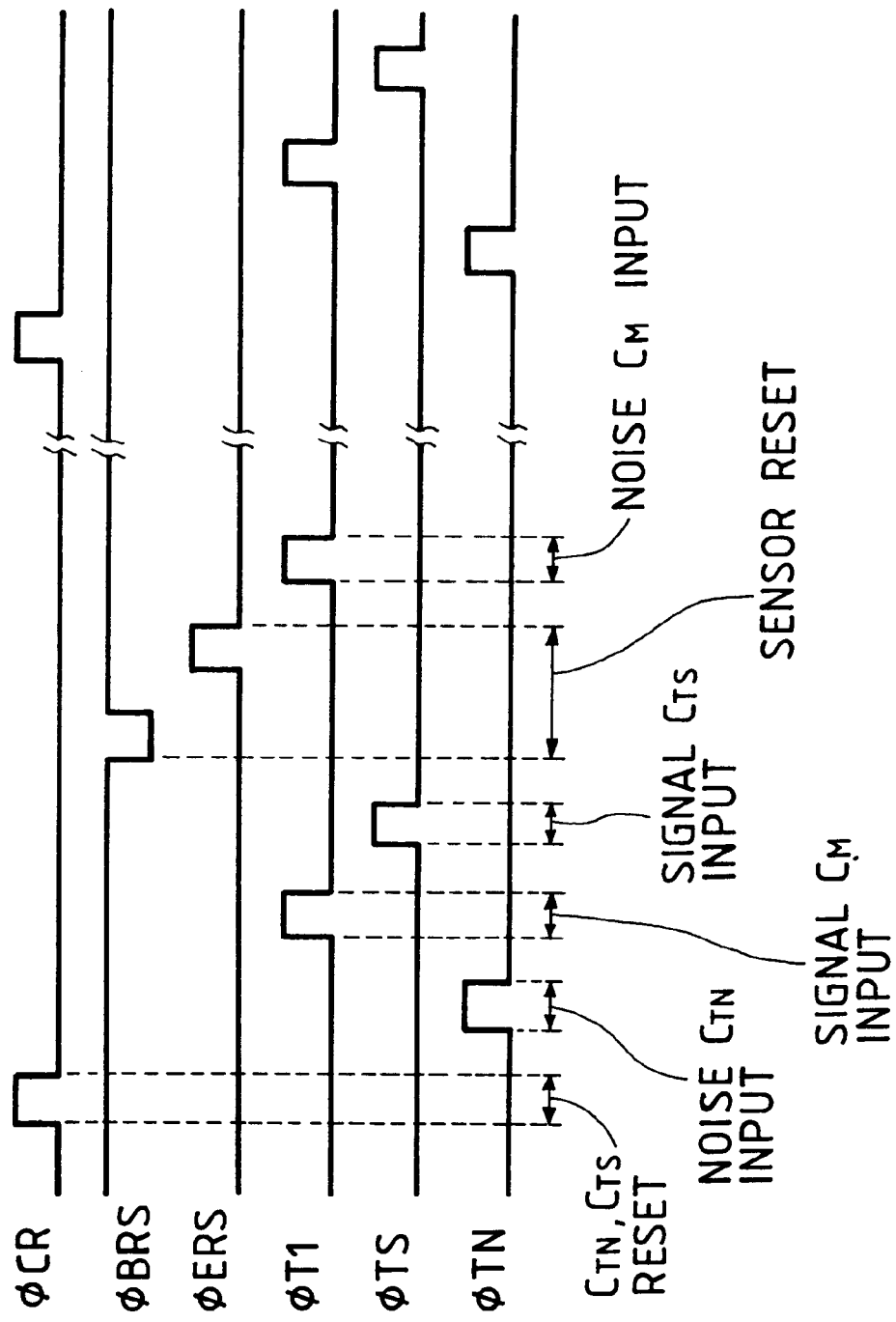

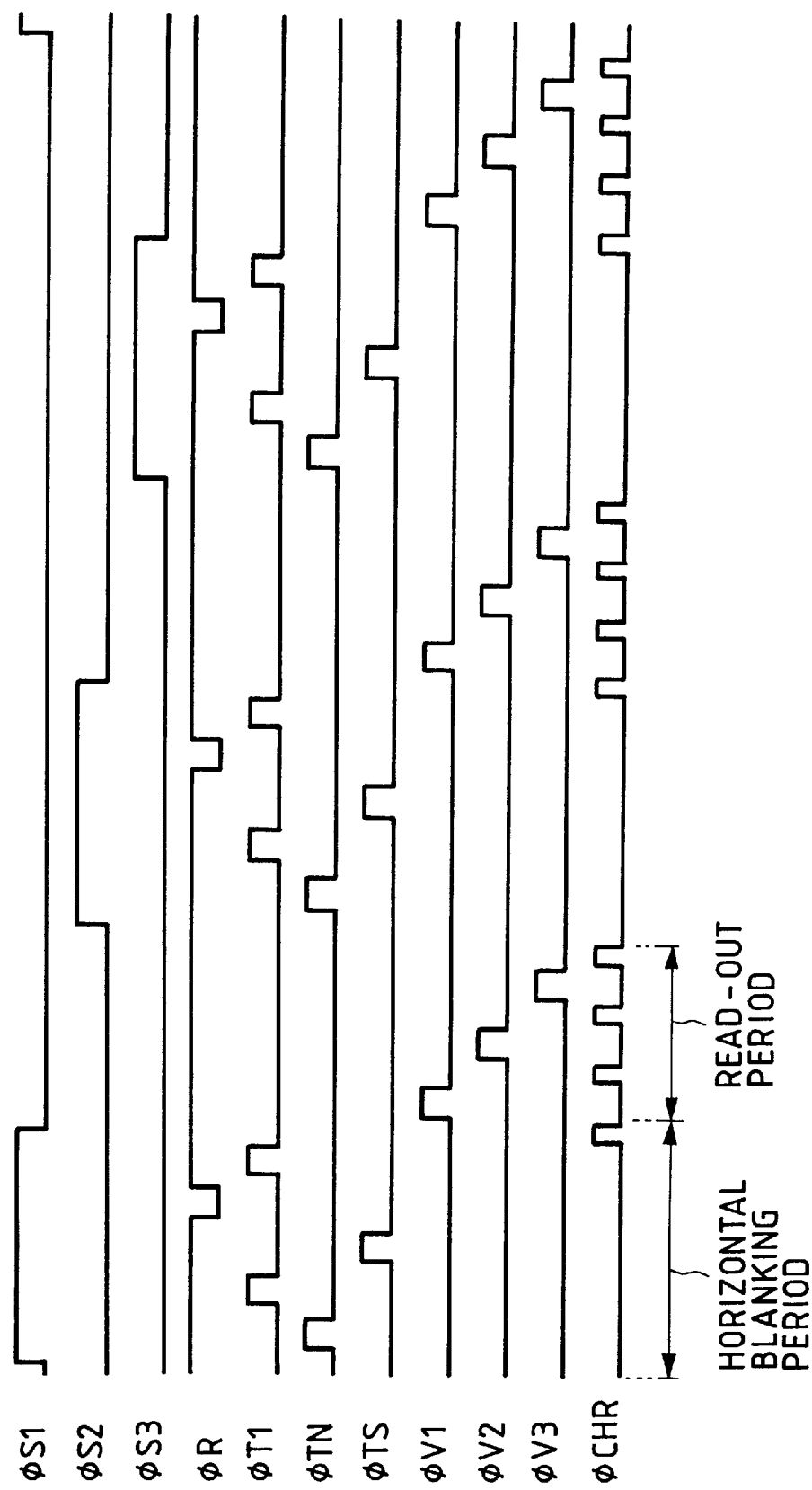

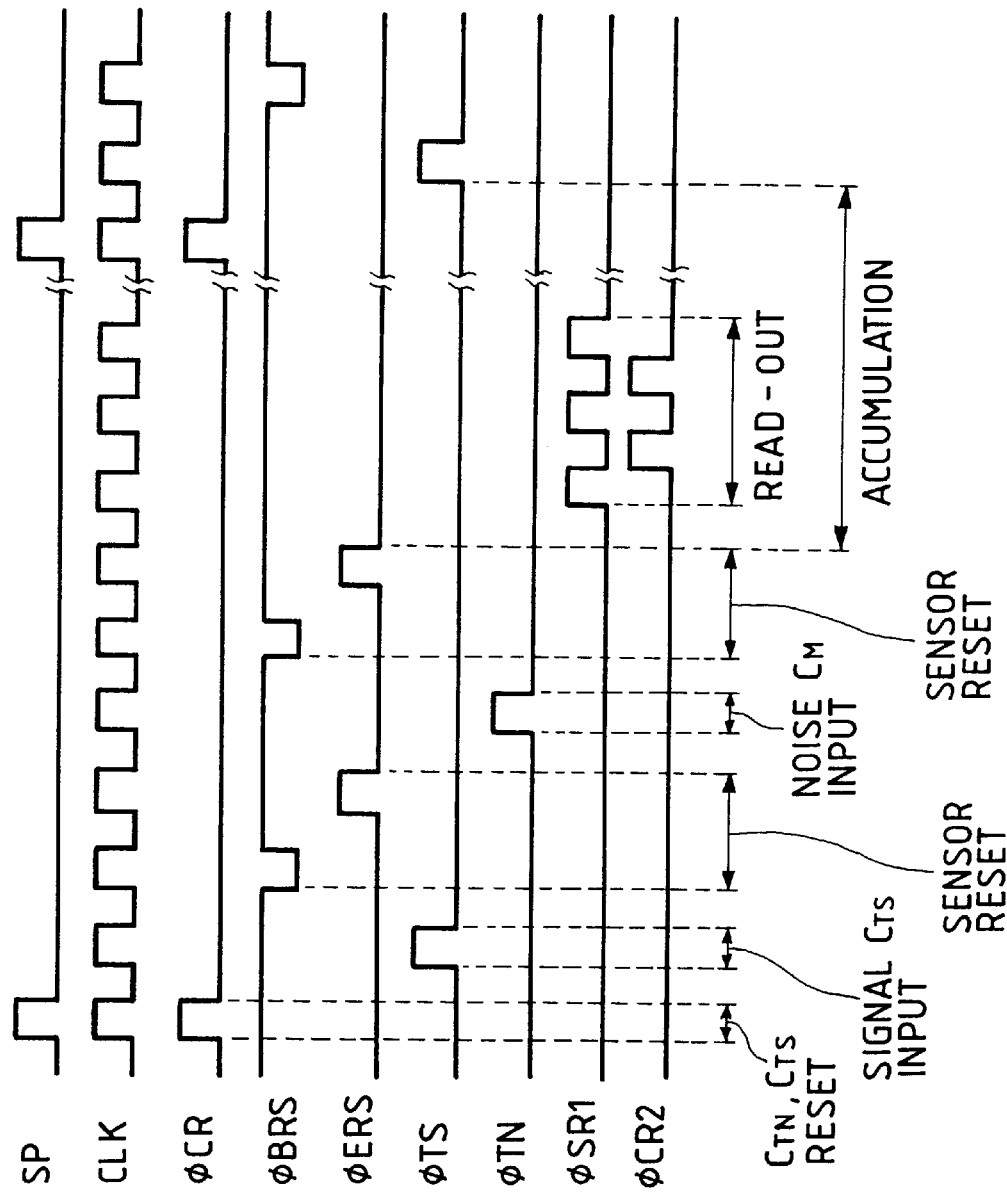

PHOTOELECTRIC CONVERSION APPARATUS HAVING RESET NOISE HOLDING AND REMOVING UNITS

BACKGROUND OF THE INVENTION

1. Field of the Invention

The invention relates to a photoelectric converting apparatus and, more particularly, to a one-dimensional or two-dimensional photoelectric converting apparatus for executing a reading operation of, for example, a facsimile, a digital copying apparatus, an X-ray image pickup apparatus, or the like. More specifically, the invention relates to a removal of a random noise which is caused by a resetting operation of a photosensor.

2. Related Background Art

Hitherto, a CCD has mainly been used as an image pickup device of an image reading system such as facsimile, digital copying apparatus, or the like, a video camera, a digital camera, or the like. In recent years, however, a development of what is called an amplifying type photoelectric converting apparatus having an amplifying function of an MOS transistor or a bipolar transistor on a pixel unit basis is also vigorously being executed.

In an amplifying type photoelectric converting apparatus, in order to realize a high sensitivity, a removal of a noise becomes important. With respect to the noise removal, however, several methods have conventionally been proposed.

FIGS. 6A and 6B are circuit diagrams of a one-dimensional photoelectric converting apparatus having a transistor as a photosensor for each pixel and a timing chart for such a circuit (refer to the magazine of The Institute of Television Engineers of Japan, Vol. 47, No. 9, pp. 1180, 1993).

The operation of such a photoelectric converting apparatus will now be described hereinbelow. When a start pulse (SP) is inputted, accumulating capacitors $C_{TS}$ and $C_{TN}$ are reset and a photosignal including a sensor noise is subsequently transferred to the capacitor $C_{TS}$.

After that, a resetting operation of a photosensor is executed and an output in a dark state including the sensor noise is transferred to the capacitor $C_{TN}$. The sensor is again reset and an accumulating operation is started. At the same time, a shift register of the first chip starts to scan and data of $C_{TS}$ and $C_{TN}$ is respectively capacitance divisionally outputted to $C_{HS}$ and $C_{HN}$ as common output lines of the first chip. The outputted signals are respectively inputted to a differential amplifier through voltage followers, so that a signal without any sensor noise is derived as an output of an IC.

"Sensor reset noise" used here denotes an FPN (Fixed Pattern Noise) which is caused due to a variation in $h_{FE}$ of a transistor serving as a photosensor of each pixel or a variation in capacitance $C_{bc}$, between a base and a collector. Namely, an emitter potential after an emitter was reset by φERS varies due to the variations in $h_{FE}$ and $C_{bc}$, every pixel. Therefore, it appears as an offset in the ordinary reading operation. However, since the offset can be removed by such a method, the FPN can be reduced.

As another prior art, s solid-state image pickup apparatus as shown in FIGS. 7 and 8 has been proposed in Japanese Patent Application Laid-Open No. 1-154678.

In the diagram, signal charges which were caused by an incident light and accumulated in each photodiode 101 are outputted by the following procedure. At the start of a horizontal blanking period of an output of the apparatus, when the photodiodes 101 of one line in the horizontal direction to be read out next are selected, a reset line 106 corresponding to such a line is turned on or off. After a resetting operation was performed by a reset switch 103, when a drain line 107 is subsequently turned on, each pixel amplifier 104 of such a line operates as a driver transistor of a source follower. An output of each source follower in this instance is an amplifier output when there is no signal charge. By turning on/off a gate line 116, the output voltage is stored into an accumulating capacitor 111 through a gate switch 109.

Subsequently, when a vertical gate line 105 corresponding to such a line in the horizontal direction is turned on or off and signal charges are supplied to a gate of each pixel amplifier 104, the output of each source follower has a value corresponding to an amount of signal charges. By turning on or off a gate line 117, the output voltage is stored into an accumulating capacitor 112 through a gate switch 110.

The operation in the horizontal blanking period is executed as mentioned above. In a horizontal scanning output period of time, a horizontal register 122 sequentially on/off scans horizontal gate switches 113 and 114 corresponding to each pixel, so that the source-follower output charges accumulated in the accumulating capacitors 111 and 112 are sequentially outputted from a horizontal signal line 120.

The output charges accumulated in the capacitors 111 and 112 are obtained by time-sequencing outputs in both of the case of resetting and the case of inputting the signal charges with regard to one pixel amplifier 104. Further, by obtaining a difference between both of those outputs, a noise which is caused by a variation in input offsets of a plurality of source followers and a 1/f noise of the source followers can be easily suppressed.

However, the prior art mentioned above has a problem to be solved such that the reset noise which is caused upon resetting of a photoelectric conversion unit cannot be removed.

Each time the photosensor is reset, an electric potential which was reset fluctuates and a reset noise appears as a random noise.

For example, in a photodiode having a pn junction, when a light production carrier $Q_p$ is accumulated into a capacitor $C_{PD}$ of a photodiode unit and converted into a voltage, a photosignal voltage $V_p$ by the light production carrier is $$V_P = Q_P / C_{PD} \tag{1}$$

On the other hand, since a reset noise $V_N$ is $$V_N = \sqrt{(kT/C_{PD})} \tag{2}$$

where, k: Boltzmann's constant
T: Temperature (° K.)
an S/N ratio is $$V_P/V_N = Q_{PD} \cdot \sqrt{(1/(kTC_{PD}))} \tag{3}$$

Therefore, from the equation (3), in order to raise the S/N ratio, although it is desirable to reduce the accumulated capacitance $C_{PD}$ of the photosensor as small as possible, there is practically a limitation. On the other hand, since there is a tendency such that the signal charges $Q_p$ decrease in accordance with the realization of a high fineness and a high speed of the photoelectric converting apparatus, the removal of the reset noise becomes an important point when realizing a high S/N ratio of the photoelectric converting apparatus.

However, in the prior art 1, as shown in the timing chart of FIGS. 6A and 6B, the sensor is reset twice and the photosignal and noise signal to be read out are based on the different sensor resetting operations. Namely, after completion of the second sensor resetting operation, the accumulating operation and the photosignal reading operation are executed. A sensor noise N which is generated by the first sensor resetting operation is subtracted from a read-out signal (S+N') including a sensor noise N' generated by the second sensor resetting operation, thereby removing the sensor noise. Therefore, a random noise that is √2 times as large as the sensor reset noise is generated.

In the prior art 2 as well, since the resetting operation by the reset switch 103 is executed in a closed state of the gate switch 109, the resetting operation of the photodiode 101 and the resetting operation by the reset switch 103 are different. Therefore, a random noise which is caused due to the resetting operation cannot be perfectly removed in a manner similar to the prior art 1.

In the prior art 2, although an example in which the gate switch 109 is not provided is also disclosed, there is a disclosure such that there is a problem such that the random noise due to the sensor resetting operation is also generated even in such a case.

Namely, in the conventional techniques, although the FPN can be improved, the random noise due to the resetting operation of the photosensor is not improved yet.

It is an object of the invention to reduce a random noise due to a resetting operation of a sensor unit in a one-dimensional or two-dimensional photoelectric converting apparatus in which a photosignal accumulation and a signal output are simultaneously executed.

SUMMARY OF THE INVENTION

As means for solving the foregoing problems, it is an object of the invention to provide a photoelectric converting apparatus for outputting a signal during an accumulation of a photosignal, comprising:

photoelectric conversion means;

reset means for resetting the photoelectric conversion means;

noise signal holding means for holding a noise signal when a resetting operation of the photoelectric conversion means is executed; and noise signal removing means for removing a noise from the signal accumulated in the photoelectric conversion means after completion of the same resetting operation by using the noise signal held.

According to the invention, there is also provided a photoelectric converting apparatus comprising:

a plurality of photoelectric conversion means arranged in a one-dimensional or two-dimensional form;

reset means for resetting the plurality of photoelectric conversion means;

noise signal read-out means for reading out noise signal charges just after the resetting operation;

photosignal read-out means for reading out photosignal charges after the photosignal was accumulated; and scanning means for sequentially scanning the noise signal of the noise signal read-out means and the photosignal of the photosignal read-out means, in which the signals are read out from the noise signal read-out means and the photosignal read-out means by the scanning means and, at the same time, the photosignal is accumulated in the photoelectric conversion means, wherein the photoelectric converting apparatus further comprises a noise signal holding unit for holding the noise signal just after the resetting operation at least means a timing before the photosignal after completion of the same resetting operation is read out by the photosignal read-out means, and for outputting a difference between the noise signal just after the resetting operation and the photosignal after completion of the same resetting operation.

According to the invention, by providing the noise holding means, after the noise generated upon resetting of the sensor was held, the accumulating operation and reading operation of the photosignal are executed as they are and the difference between the noise and the photosignal in the same sensor resetting operation can be obtained, so that a random noise which is caused upon sensor resetting can be perfectly removed.

The above and other objects and features of the present invention will become apparent from the following detailed description and the appended claims with reference to the accompanying drawings.

BRIEF DESCRIPTION OF THE DRAWINGS

FIGS. 1A and 1B are circuit diagrams of the first embodiment of the invention and a timing chart showing the operation of such a circuit respectively;

FIGS. 2A and 2B are circuit diagrams of the second embodiment of the invention and a timing chart showing the operation of such a circuit respectively;

FIG. 5 is a timing chart showing the operation of the circuit of the fourth embodiment of the invention;

FIGS. 6A and 6B are circuit diagrams of a prior art 1 and a timing chart showing the operation of such a circuit respectively;

DETAILED DESCRIPTION OF THE PREFERRED EMBODIMENTS

An embodiment of the invention will now be described in detail hereinbelow with reference to the drawings.

Figure 1A:
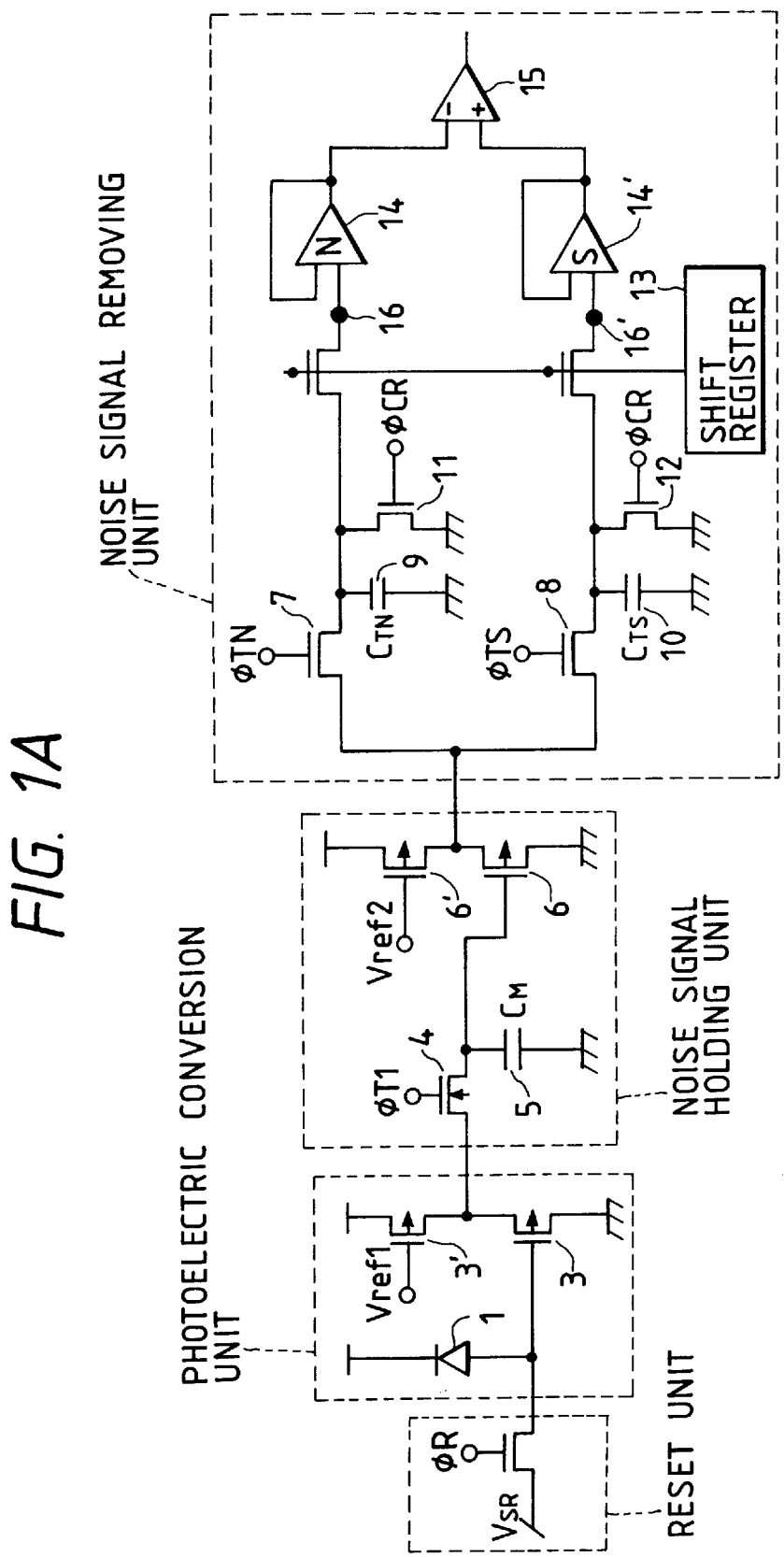

FIGS. 1A and 1B are circuit diagrams of a photoelectric converting apparatus according to the first embodiment of the invention and its timing chart.

As shown in the diagram, the photoelectric converting apparatus of the embodiment is constructed by:

a photodiode 1 serving as photoelectric conversion unit; MOS transistors 3 and 3'; an MOS switch 2 serving as a reset unit of the photoelectric conversion unit;

MOS transistors 4, 6, and 6' and a capacitor ($C_M$) 5 serving as a noise signal holding unit for holding a noise signal upon resetting of the photoelectric conversion unit; and a noise signal removing unit (7 to 16) for removing a noise from the signal accumulated in the photoelectric conversion unit after completion of the same resetting operation by using the noise signal held.

There is also provided a photoelectric converting apparatus constructed by:

an MOS switch 7 and a capacitor ($C_{TN}$) 9 serving as a noise signal read-out unit for reading out noise signal charges just after the resetting operation;

an MOS switch 8 and a capacitor ($C_{TS}$) 10 serving as a photosignal read-out unit for reading out photosignal charges after the photosignal was accumulated;

a shift register 13 serving as a scanning unit for sequentially scanning the noise signal of the noise signal read-out unit and the photosignal of the photosignal read-out unit, in which the signals are read out from the noise signal read-out unit (7, 9) and the photosignal read-out unit (8, 10) by the scanning unit and, at the same time, the photosignal is accumulated in the photoelectric conversion unit, wherein the photoelectric converting apparatus further has a noise signal holding unit (4, 5, 6, 6') for holding the noise signal just after the resetting operation until a timing before the photosignal accumulated after completion of the same resetting operation is read out to the photosignal read-out unit (8, 10), and buffer amplifiers 14 and 14' and a differential amplifier 15 serving as a unit for outputting a difference between the noise signal held just after the resetting operation and the photosignal after completion of the same resetting operation.

The MOS transistors (6, 6') and (3, 3') construct MOS source followers, respectively.

Inputs 16 and 16' of the buffer amplifiers 14 and 14' are common output lines and as for the component elements other than the buffer amplifiers 14 and 14' and differential amplifier 15, the apparatus has those component elements of the number of bits as many as the number of bits.

In the embodiment, all of the portions shown in the diagram are formed on a same semiconductor substrate.

The operation and a construction of the embodiment will now be described hereinbelow with reference to the timing chart.

When the start pulse SP is first inputted, the capacitors $C_{TS}$ 10 and $C_{TN}$ 9 for accumulating the photosignal and the noise signal are first reset.

Subsequently, a drive pulse $\phi$TN is turned on and the noise signal held in the capacitor $C_M$ 5 is read out to the capacitor $C_{TN}$ 9. In this instance, the noise signal that is read out from the capacitor $C_M$ 5 is a noise signal just after the sensor was reset in the previous field. After the noise signal was read out to the capacitor $C_{TN}$ 9, a drive pulse $\phi$T1 is turned on and the photosignal is read out to the capacitor $C_M$ 5. Further, a drive pulse $\phi$TS is turned on and the photosignal is read out to the capacitor $C_{TS}$ 10.

After that, a drive pulse $\phi$R is turned on and the sensor is reset. Subsequently, the drive pulse $\phi$T1 is turned on and the signal just after the sensor was reset is read out as a noise signal to the capacitor $C_M$ 5. The sensor starts to accumulate.

Simultaneously with the accumulating operation of the sensor, the photosignal held in the capacitor $C_{TS}$ 10 and the noise signal held in the capacitor $C_{TN}$ 9 are sequentially outputted to the common output lines. Finally, the difference between the photosignal and the noise signal is obtained from a differential circuit or the like (not shown) and is outputted as a true photosignal.

In the invention, therefore, the noise signal for a sensor reset denoted by (1) in the timing chart is held in the capacitor $C_M$ 5 for an accumulation period of time (A) and is inputted to the capacitor $C_{TN}$ 9 before the photosignal is read out (A'). Therefore, since a difference between the noise signal (A') for the same sensor reset of (1) and a photosignal (B') can be outputted as a true photosignal, a sensor reset noise can be perfectly removed.

The noise removing unit is not limited to that in the foregoing embodiment but, for example, a clamping circuit or the like can be also used.

As disclosed in Japanese Patent Application No. 61-219666 (1986), a circuit for holding a sensor signal, a circuit for holding a reference signal, and a differential amplifier for outputting a difference signal of them can be also used as a differential circuit.

Figure 2A:
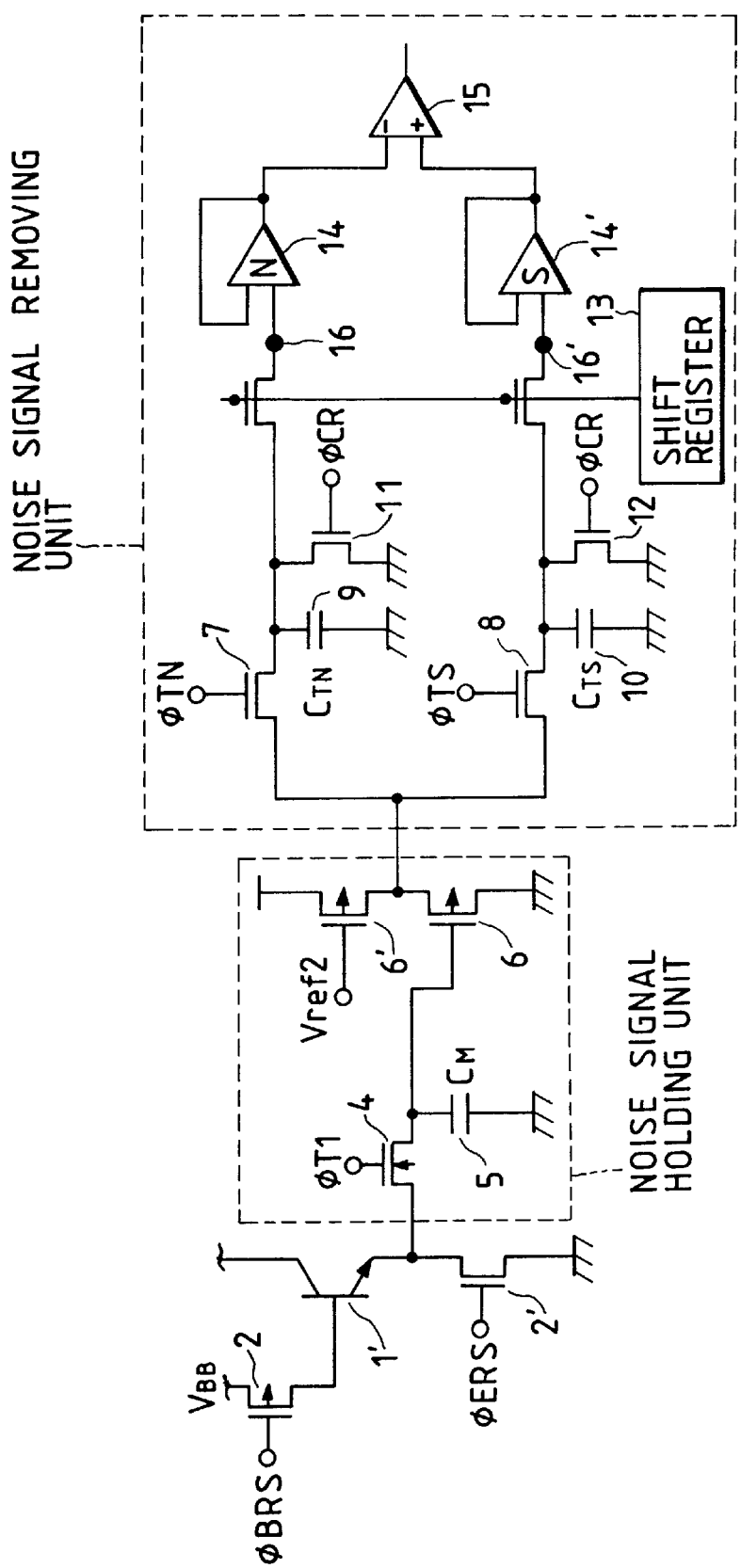

FIGS. 2A and 2B are circuit diagrams showing the second embodiment of the invention and its timing chart.

The second embodiment differs from the first embodiment with respect to a point that a photoelectric conversion unit by a bipolar transistor 1' is used. In the embodiment as well, a portion surrounded by a broken line corresponds to the noise signal holding unit and its construction is the same as that of the first embodiment.

The operation will now be described hereinbelow with reference to the timing chart.

When a start pulse (not shown) is inputted, a drive pulse $\phi$CR is turned on and the photosignal accumulating capacitor $C_{TS}$ 10 and noise signal accumulating capacitor $C_{TN}$ 9 are reset.

Subsequently, the drive pulse $\phi$TN is turned on and the noise signal is read out to the capacitor $C_{TN}$ 9.

The drive pulse $\phi$T1 is turned on and the photosignal is read out to the capacitor $C_M$ 5.

The drive pulse $\phi$Ts is turned on and the photosignal is read out-to the capacitor $C_{TS}$ 10.

A drive pulse $\phi$BRS is turned on and a base of the bipolar transistor 1' is clamp-reset to $V_{BB}$. Further, by turning on a drive pulse $\phi$ERS, the sensor is reset.

The drive pulse $\phi$T1 is turned on and the noise signal generated upon resetting of the sensor is inputted to the capacitor $C_M$ 5. After that, the accumulating operation of the sensor is executed.

Simultaneously with that the sensor executes the accumulation, the photosignal held in the capacitor $C_{TS}$ 10 and the noise signal held in the capacitor $C_{TN}$ 9 are sequentially outputted to the common output lines. Finally, the difference between the photosignal and the noise signal is derived by the differential amplifier 15 and is outputted as a true photosignal.

According to the invention as well, therefore, the noise signal for the sensor reset is held in the capacitor $C_M$ 5 for the accumulation period of time and is inputted to the capacitor $C_{TN}$ 9 before the photosignal is read out. Consequently, since a difference between the noise signal and the photosignal for the same sensor reset can be outputted as a true photosignal, the sensor reset noise can be perfectly removed.

It is not always necessary to use the noise holding capacitor $C_M$ 5. In such a case, a parasitic capacitance of a wiring or an element can be used in place of the capacitor $C_M$ 5.

In the embodiment, the component elements other than the differential amplifier 15 are formed on the same semiconductor substrate.

Figure 3A:
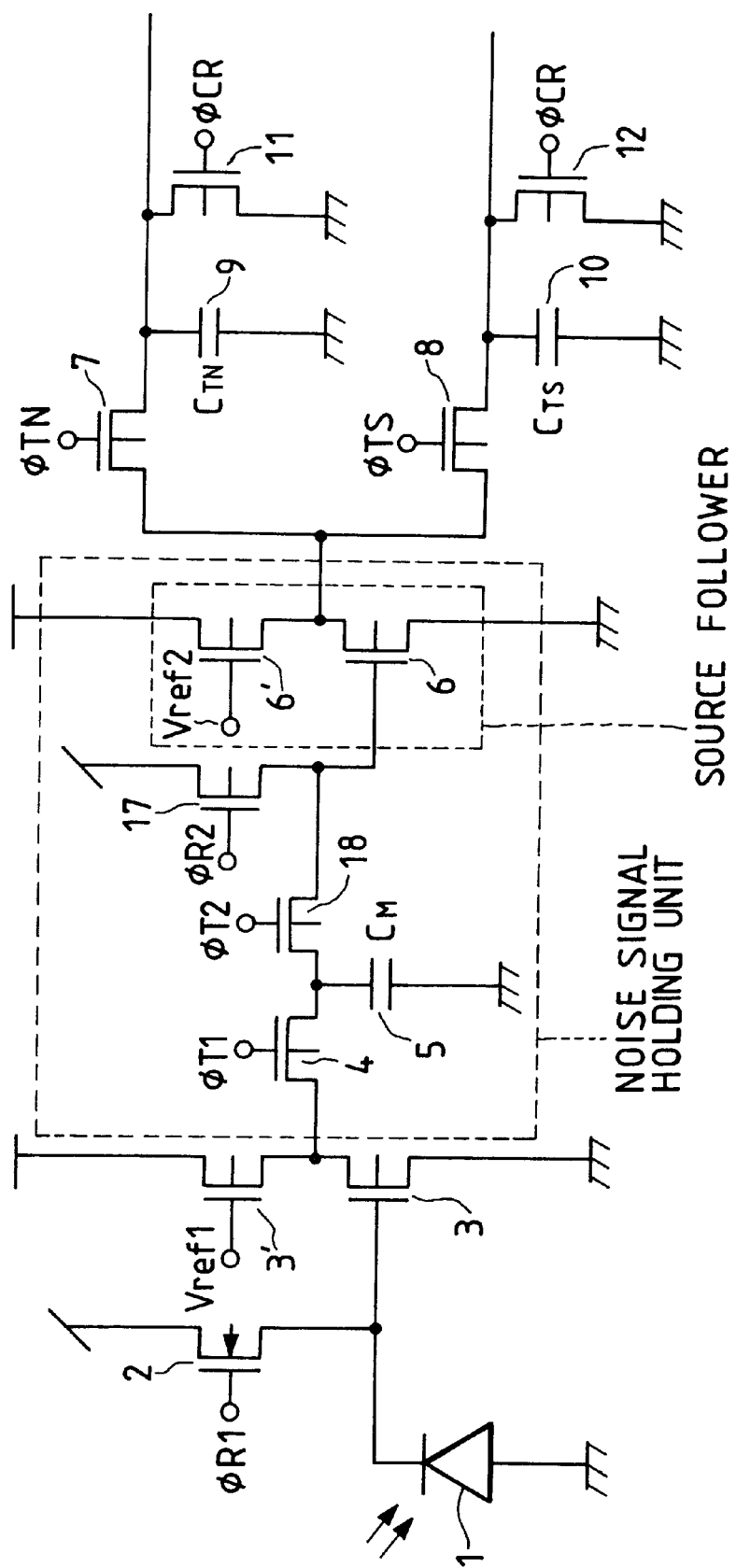
FIGS. 3A and 3B are circuit diagrams of the third embodiment of the invention and a timing chart showing the operation of such a circuit respectively.
Figure 3B:
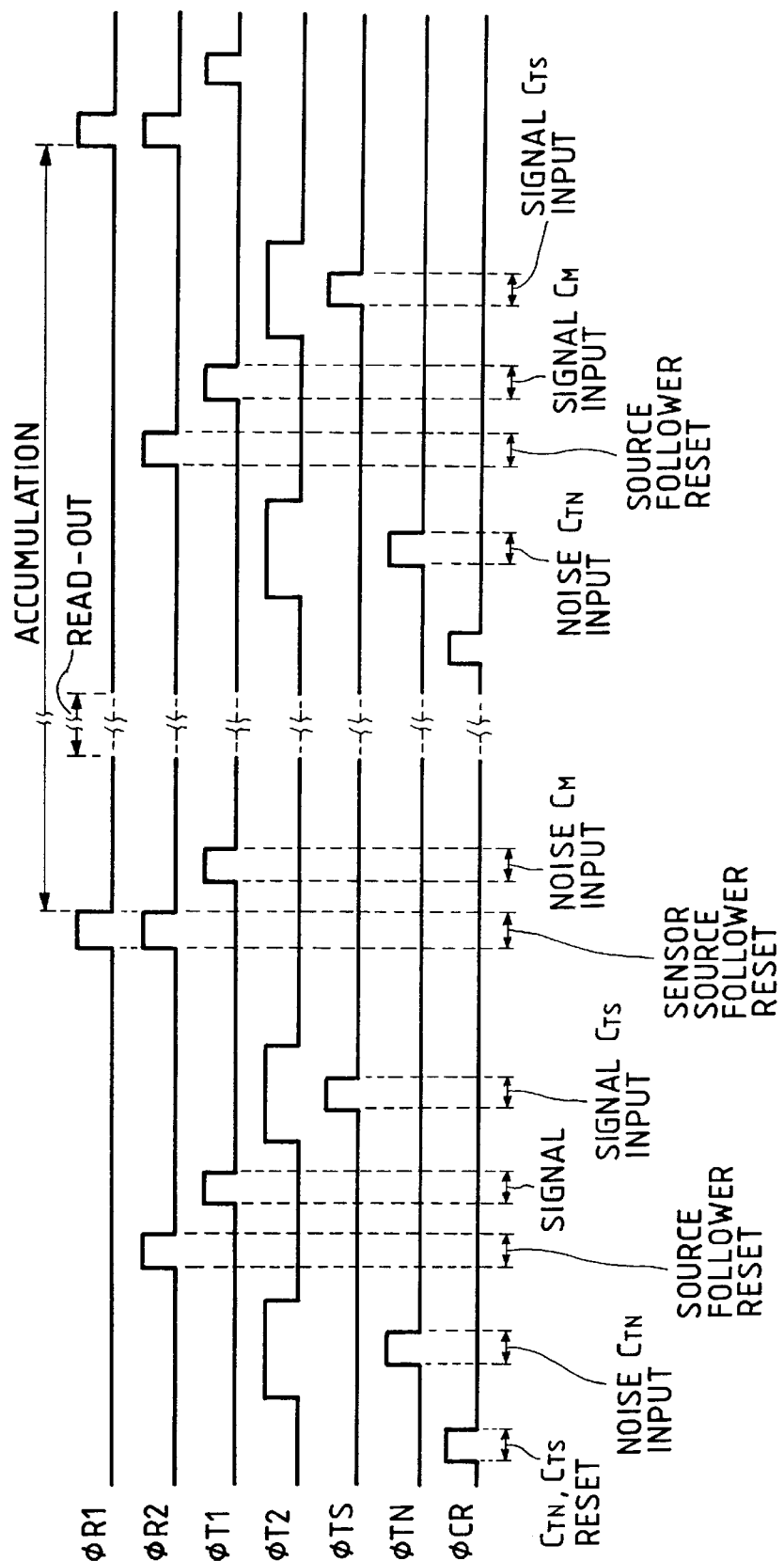

FIGS. 3A and 3B are circuit diagrams of a photoelectric converting apparatus and its timing chart according to the third embodiment of the invention.

In the diagram, reference numeral 1 denotes the photodiode and a portion surrounded by a broken line corresponds to a noise signal holding unit as a feature of the invention and is constructed by: the capacitor $C_M$ 5 to hold a noise signal; MOS transistor switches 4, 18, and 17; and source-follower circuits 6 and 6' of the MOS transistors. The noise signal holding unit also has the capacitor $C_{TS}$ 10 for accumulating the photosignal and the capacitor $C_{TN}$ 9 for accumulating the noise signal.

The operation and construction of the embodiment will now be described hereinbelow with reference to the timing chart.

First, when a start pulse SP (not shown) is inputted, the drive pulse φCR is first turned on and the capacitor $C_{TS}$ 10 for accumulating the photosignal and the capacitor $C_{TN}$ 9 for accumulating the noise signal are reset.

Subsequently, a drive pulse φT2 is turned on, the drive pulse φTN is turned on during such an ON period of time, and the noise signal is inputted to the capacitor $C_{TN}$ 9.

A drive pulse φR2 is turned on and the source followers 6 and 6' are reset.

The drive pulse φT1 is turned on and the photosignal is inputted to the capacitor $C_M$ 5.

The drive pulse φT2 is turned on, the drive pulse φTS is turned on during such an ON period of time, and the photosignal is inputted to the capacitor $C_{TS}$ 10.

After that, drive pulses φR1 and φR2 are turned on, thereby resetting the sensor and the source followers. The drive pulse φT1 is turned on and the signal just after the sensor was reset is read out as a noise signal to the capacitor $C_M$ 5. The sensor starts the accumulating operation.

Simultaneously with the accumulating operation of the sensor, the photosignal held in the capacitor $C_{TS}$ 10 and the noise signal held in the capacitor $C_{TN}$ 9 are sequentially outputted to the common output lines. Finally, the difference between the photosignal and the noise signal is derived by a differential circuit (not shown) and is outputted as a true photosignal.

Therefore, even in the invention as well, the noise signal for the sensor reset is held in the capacitor $C_M$ 5 during the accumulation period of time and is inputted to the capacitor $C_{TN}$ 9 before the photosignal is read out. Since a difference between the noise signal and the photosignal for the same sensor reset, consequently, can be outputted as a true photosignal, the sensor reset noise can be perfectly removed.

Figure 4:
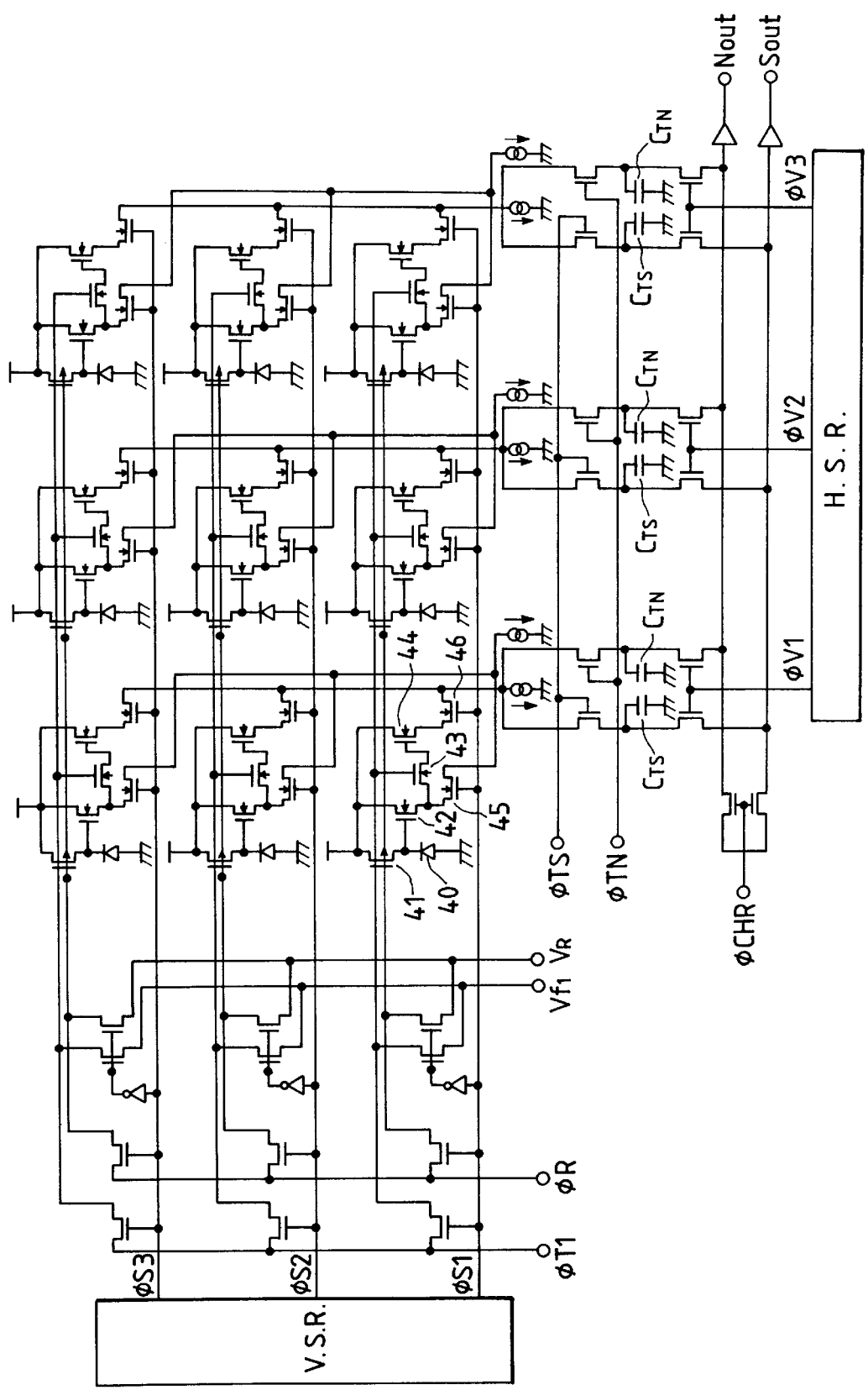
FIG. 4 is a circuit diagram of the fourth embodiment of the invention.
Figure 6A:
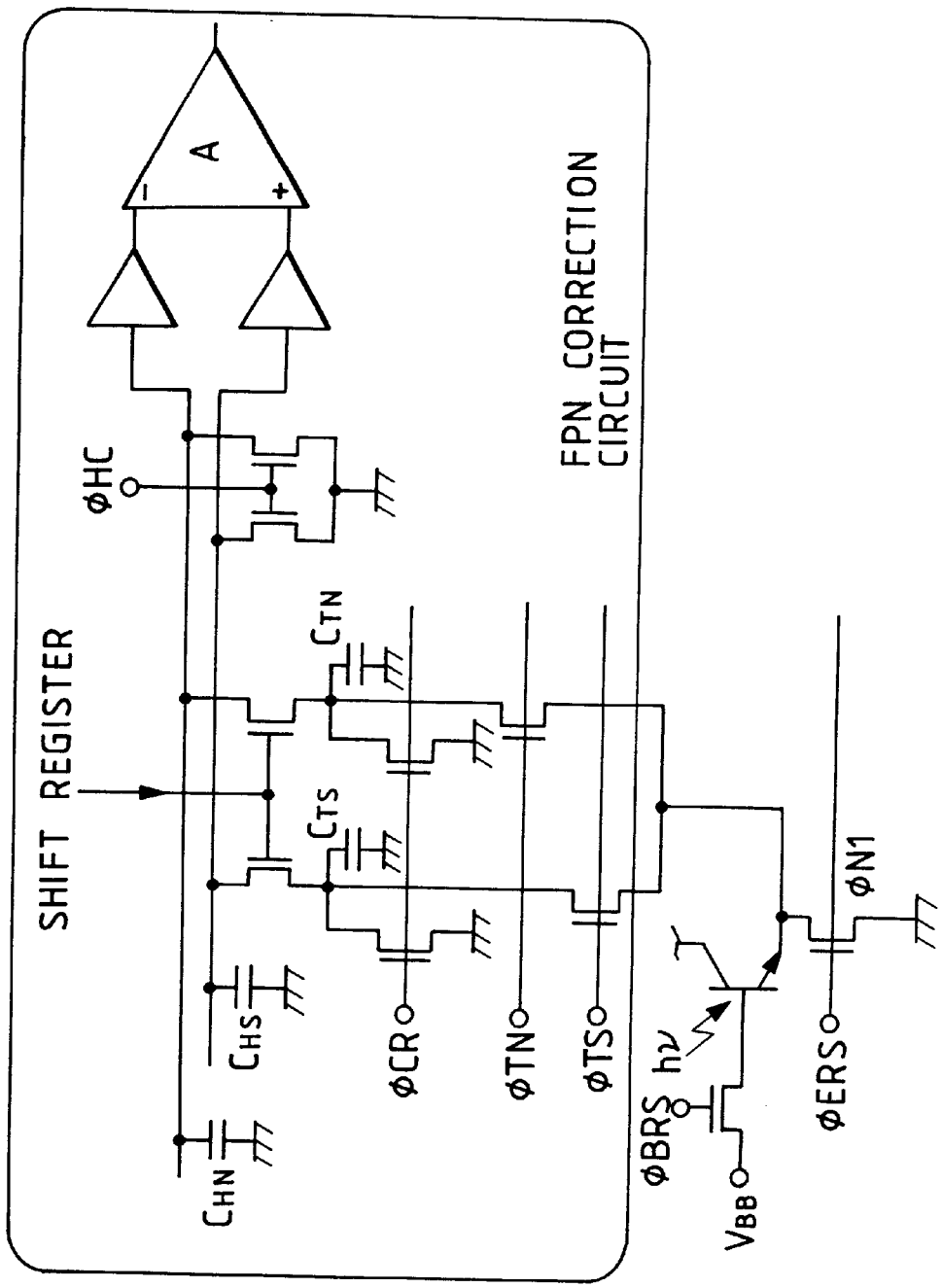
Figure 7:
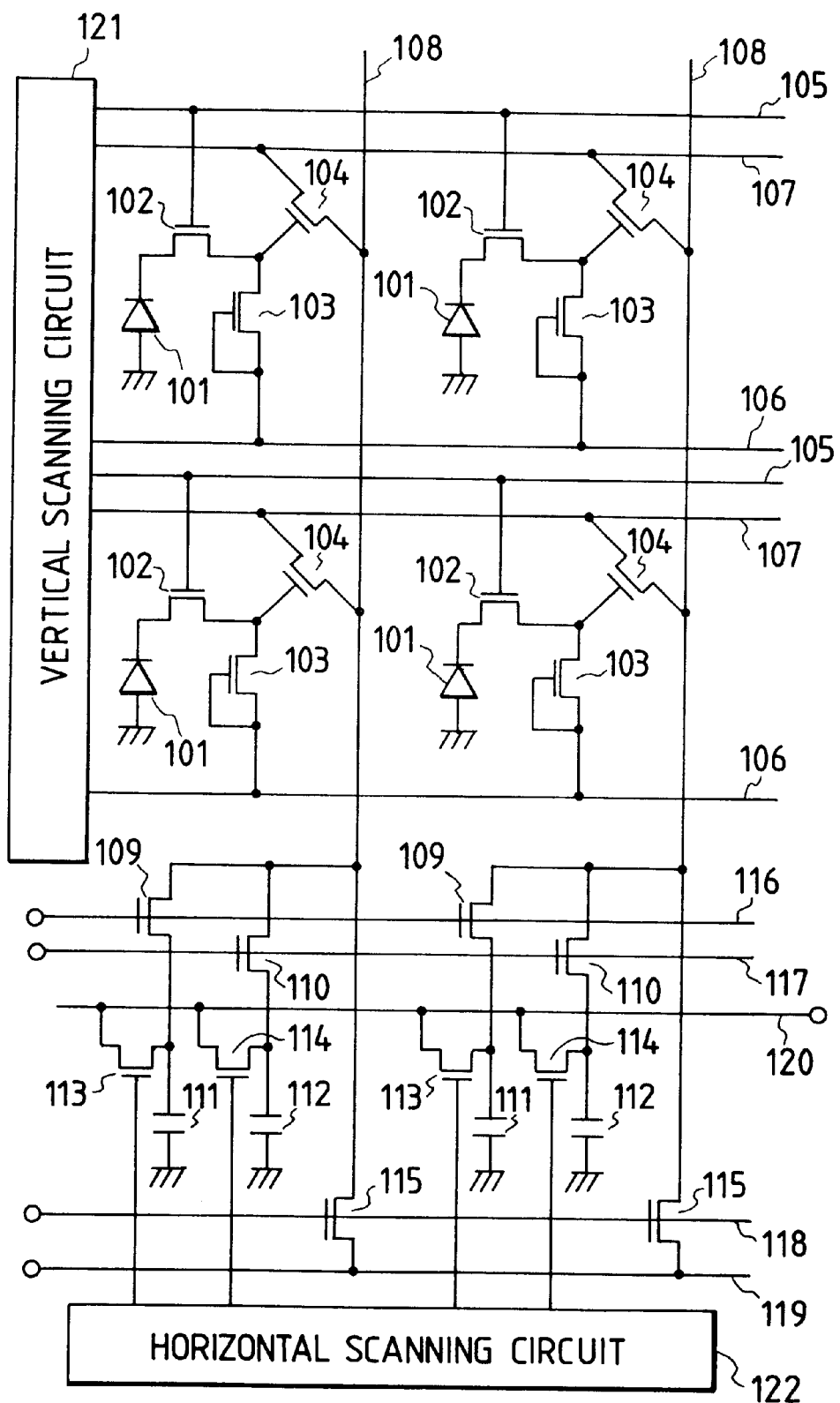
FIG. 7 is a circuit diagram of a prior art 2.
Figure 8:
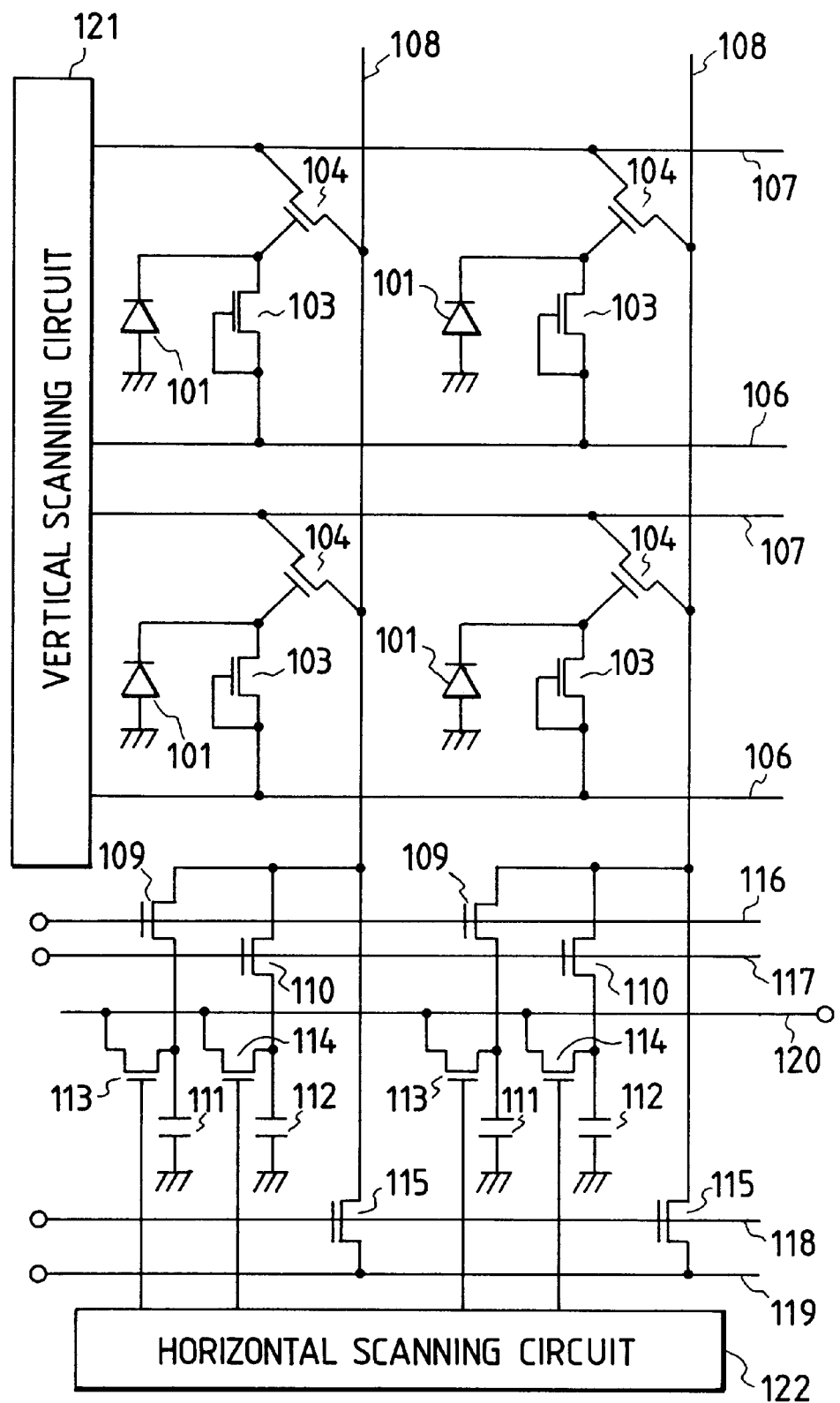
FIG. 8 is a circuit diagram of the prior art 2.

FIG. 4 is a circuit diagram showing the fourth embodiment of the invention. FIG. 5 is a timing chart thereof. In the embodiment, there is shown an image reading apparatus in which a plurality of photoelectric converting elements of the invention mentioned above are arranged in a two-dimensional form and a horizontal shift register H.S.R. and a vertical shift register V.S.R. are connected.

As shown in the diagram, each pixel has: a photodiode serving as a photoelectric conversion unit; and an MOS transistor 44 forming a source follower as a noise signal holding unit together with an MOS transistor switch 43. A gate capacitor of the MOS transistor 44 is used as a noise holding capacitor mentioned above.

One photosignal accumulating capacitor $C_{TS}$ and one noise signal accumulating capacitor $C_{TN}$ mentioned above are connected to a plurality of pixels.

The operation and construction of the embodiment will now be described hereinbelow with reference to the timing chart.

When the start pulse SP (not shown) is inputted, the photosignal accumulating capacitor $C_{TS}$ and the noise signal accumulating capacitor $C_{TN}$ are first reset.

Subsequently, the drive pulse φTN is turned on and the noise signal is read out from the gate capacitor of the MOS transistor 44 to the capacitor $C_{TN}$. Further, the drive pulse φTS is turned on and the photosignal is read out to the capacitor $C_{TS}$.

After that, the drive pulse φR is turned on, thereby resetting the sensor. Subsequently, the drive pulse φT1 is turned on and the signal just after the sensor was reset is read out to the gate capacitor of the MOS transistor 44 through a source follower of an MOS transistor 42, and the sensor starts the accumulating operation.

Simultaneously with the accumulating operation of the sensor, the photosignal held in the capacitor $C_{TS}$ and the noise signal held in the capacitor $C_{TN}$ are sequentially outputted to the common output lines. Finally, the difference between the photosignal and the noise signal is derived by a differential circuit (not shown) and is outputted as a true photosignal.

In the invention, therefore, the noise signal for the sensor reset is held in the gate capacitor of the MOS transistor 44 during the accumulation period of time and is inputted to the capacitor $C_{TN}$ before the photosignal is read out. Therefore, since the difference between the noise signal and the photosignal for the same sensor reset can be outputted as a true photosignal, the sensor reset noise can be perfectly removed.

In the area sensor or the like as shown in the embodiment, in order to improve a numerical aperture, as a photodiode 40, for instance, a photoconductive film such as amorphous silicon is laminated onto the semiconductor substrate and a resultant device can be also used.

According to the invention as described above, by using the noise holding unit, after the noise generated at the time of the first sensor reset was held, the accumulating operation and reading operation of the photosignal are executed as they are and the difference between the noise and the photosignal in the first reset can be obtained, so that the sensor reset noise can be perfectly removed.

Namely, in the invention, the noise signal for the sensor reset is held in the noise signal holding unit during the accumulation period of time and is inputted to the capacitor $C_{TN}$ before the photosignal is read out. Therefore, since the difference between the noise signal and the photosignal for the sensor reset can be outputted as a true photosignal, the sensor reset noise can be perfectly removed.

Many widely different embodiments of the present invention may be constructed without departing from the spirit and scope of the present invention. It should be understood that the present invention is not limited to the specific embodiments described in the specification, except as defined in the appended claims.

What is claimed is:

1. A photoelectric conversion apparatus, comprising:
   photoelectric conversion circuit including a photo-receiving portion for receiving a photosignal from an object, converting the photosignal into an electric signal, and accumulating charges generated thereby;
   reset circuit for resetting said photo-receiving portion;
   noise signal holding circuit for holding reset noise caused when a resetting operation of said photo-receiving portion by said reset circuit is executed while the charges are being accumulated in said photo-receiving portion; and
   noise signal removing circuit for performing a difference operation between a first signal and a second signal, wherein the first signal includes the reset noise held in said noise signal holding circuit, and the second signal includes the reset noise and a signal generated by receiving the photosignal in a first period after completion of the resetting operation, and wherein said noise signal removing circuit performs the difference operation while said photo-receiving portion accumulates the charges after a reset of said photo-receiving portion which is performed by said reset circuit after the signal generated by receiving the photosignal in said first period is read out from said photo-receiving portion.

2. An apparatus according to claim 1, wherein said noise signal holding circuit has at least an MOS transistor.

3. An apparatus according to claim 2, wherein said noise signal holding circuit is constructed by at least an MOS source follower and an MOS transistor switch.

4. An apparatus according to claim 3, wherein said noise signal holding circuit is constructed by at least an MOS sources follower, an MOS transistor switch, and a capacitor.

5. An apparatus according to claim 1, wherein said photoelectric conversion circuit has at least a photodiode and an MOS source follower.

6. An apparatus according to claim 5, wherein said photoelectric conversion circuit has at least a photodiode and an MOS source follower.

7. An apparatus according to claim 1, wherein at least parts of a photosignal accumulation period of time and a read-out period of time are simultaneously executed.

8. An apparatus according to claim 1, wherein said photoelectric conversion circuit, said noise signal holding circuit, and said noise signal removing circuit are formed on a same semiconductor substrate.

9. An apparatus according to claim 1, wherein said noise signal removing circuit further comprises:
first signal holding circuit for accumulating the first signal;
second signal holding circuit for accumulating the second signal; and
difference generation circuit for generating the difference signal between the first signal read out from said first signal holding circuit, and the second signal read out from said second signal holding circuit.

10. An apparatus according to claim 9, wherein said photoelectric conversion circuit, said reset circuit, said noise signal holding circuit, said first signal holding circuit, said second signal holding circuit and said difference generation difference generation circuit are formed on a same semiconductor substrate.

11. An apparatus according to claim 9, wherein the accumulation of the charges in said photo-receiving portion, and the reading out of the first and second signals respectively from said first and second signal holding circuit, are performed simultaneously in at least a portion of a period which starts after the resetting operation.

12. An apparatus according to claim 1, wherein said noise signal holding circuit is provided between said photoelectric conversion circuit and said noise signal removing circuit.

13. An apparatus according to claim 1, wherein said photoelectric conversion circuit and said reset circuit are arranged one-dimensionally or two-dimensionally.

14. An apparatus according to claim 1, wherein said noise signal holding circuit is arranged one-dimensionally or two-dimensionally.

15. A photoelectric conversion apparatus comprising:
a plurality of photoelectric conversion circuit, each of said photoelectric conversion circuit including a photo-receiving portion for receiving a photosignal from an object, converting the photosignal into an electric signal, and accumulating charges generated thereby;
reset circuit for supplying a reset level to said photo-receiving portion from an input side of a transfer transfer circuit;
noise signal holding circuit including a capacitor for holding reset noise caused when a resetting operation of said photo-receiving portion by said reset circuit is executed while the charges are being accumulated in said photo-receiving portion and transfer circuit for transferring the reset noise from the said photoelectric conversion circuit to said capacitor, wherein said reset circuit supplies said reset level to said photo-receiving portion from an input side of said transfer circuit; and
noise signal removing circuit performing a difference operation between a first signal and a second signal, wherein the first signal includes the reset noise held in said noise signal holding circuit, and the second signal includes the reset noise and a signal generated by receiving the photosignal in a first period after completion of the resetting operation, and wherein said noise signal removal circuit performs the difference operation while said photo-receiving portion accumulates the charges after a reset of said photo-receiving portion which is performed by said reset circuit after the signal generated by receiving the photosignal in said first period is read out from said photo-receiving portion.

16. An apparatus according to claim 15, wherein said noise signal holding circuit and said reset circuit are arranged in each of said plurality of photoelectric conversion circuit.

17. An apparatus according to claim 15, wherein said noise signal removing circuit further comprises:
first signal holding circuit for accumulating the first signal;
second signal holding circuit for accumulating the second signal; and
difference generation circuit for generating the difference signal between the first signal read out from said first signal holding circuit, and the second signal read out from said second signal holding circuit.

18. An apparatus according to claim 17, wherein the accumulation of the charges in said photo-receiving portion of said photoelectric conversion circuit, and the reading out of the first and second signals respectively from said first and second signal holding circuit, are performed simultaneously in at least a portion of a period which starts after the resetting operation.

19. An apparatus according to claim 15, wherein said noise signal holding circuit is provided between said photoelectric conversion circuit and said noise signal removing circuit.

20. An apparatus according to claim 15, wherein said plurality of photoelectric conversion circuit and said reset circuit are arranged one-dimensionally or two-dimensionally.

21. A photoelectric conversion apparatus comprising:
a plurality of photoelectric conversion circuit, each of said photoelectric conversion circuit including a photo-receiving portion for receiving a photosignal from an object, converting the photosignal into an electric signal, and accumulating charges generated thereby and amplifying circuit for amplifying a signal from said photo-receiving portion;
reset circuit for resetting said photo-receiving portion;
noise signal holding circuit for holding reset noise caused when a resetting operation of said photo-receiving portion by said reset circuit is executed while the charges are being accumulated in said photo-receiving portion, wherein said noise signal holding circuit holds a reset noise outputted from said amplifying circuit; and noise signal removing circuit for performing a difference operation between a first signal and a second signal, wherein the first signal includes the reset noise held in said noise signal holding circuit, and the second signal includes the reset noise and a signal generated by receiving the photosignal in a first period after completion of the resetting operation, and wherein said noise signal removal circuit performs the difference operation while said photo-receiving portion accumulates the charges after a reset of said photo-receiving portion which is performed by said reset circuit after the signal generated by receiving the photosignal in said first period is read out from said photo-receiving portion.

22. An apparatus according to claim 21, wherein said amplifying circuit is a source follower circuit.

23. An apparatus according to claim 21, wherein said noise signal holding circuit and said reset circuit are arranged in each of said plurality of photoelectric conversion circuit.

24. An apparatus according to claim 21, wherein said noise signal removing circuit further comprises:
first signal holding circuit for accumulating the first signal;
second signal holding circuit for accumulating the second signal; and
difference generation circuit for generating the difference signal between the first signal read out from said first signal holding circuit, and the second signal read out from said second signal holding circuit.

25. An apparatus according to claim 24, wherein the accumulation of the charges in said photo-receiving portion of said photoelectric conversion circuit, and the reading out of the first and second signals respectively from said first and second signal holding circuit, are performed simultaneously in at least a portion of a period which starts after the resetting operation.

26. An apparatus according to claim 21, wherein said noise signal holding circuit is provided between said photoelectric conversion circuit and said noise signal removing circuit.

27. An apparatus according to claim 21, wherein said plurality of photoelectric conversion circuit and said reset circuit are arranged one-dimensionally.

28. An apparatus according to claim 21, wherein said plurality of photoelectric conversion circuit and said reset circuit are arranged two-dimensionally.

29. An apparatus according to claim 21, wherein said amplifying circuit includes an amplifying transistor whose control electrode area is connected to said photo-received portion without connection via a transistor.

30. An apparatus according to claim 29, wherein said amplifying circuit further includes a constant-current load, and wherein said constant-current load and said amplifying transistor form a source-follower circuit.

31. A photoelectric conversion apparatus comprising:
a plurality of photoelectric conversion units, each photoelectric conversion unit comprising:
a photoelectric conversion portion adapted to receive a photo-signal from an object, convert the received photo-signal into an electric signal, and accumulate photo-charge,
an amplifier transistor adapted to amplify a signal from said photoelectric conversion portion and output the amplified signal, and
a reset transistor adapted to supply a reset signal to said photoelectric conversion portion, wherein a control electrode area of said amplifier transistor is connected to said photoelectric conversion portion without connection via a transistor;
a plurality of first accumulation units arranged correspondingly to respective ones of said plurality of photoelectric conversion units and adapted to accumulate a signal from said photoelectric conversion portion of a respective one of said photoelectric conversion units, each accumulation unit comprising:
a switching transistor adapted to transfer the signal from the photoelectric conversion unit,
a capacitor adapted to accumulate the signal transferred through said switching transistor, and
a read-out transistor adapted to read out the signal accumulated in said capacitor;
a plurality of second accumulation units adapted to accumulate signals from said plurality of first accumulation units;
a common output line adapted to output sequentially the signals from said plurality of second accumulation units;
a drive circuit adapted to effect control so that during a time period in which the signals from said plurality of second accumulation units are output sequentially to said common output line, a signal which is generated due to reset of said photoelectric conversion portion at a first timing is stored in said capacitor of said first accumulation unit and accumulation of photo-charge is performed in said photoelectric conversion portion for a predetermined time, wherein the accumulation of photo-charge to be performed for the predetermined time is started when said photoelectric conversion portion is reset at the first timing; and
a differential circuit adapted to perform a differential processing between the signal from said first accumulation unit, which is generated due to the reset of said photoelectric conversion portion at the first timing, and a signal generated by accumulating the photo-charge in said photoelectric conversion portion for the predetermined time after the reset at the first timing.

32. An apparatus according to claim 31, wherein said read-out transistor amplifies a signal in said control electrode area and outputs the amplified signal from a main electrode area.

33. An apparatus according to claim 31, further comprising a constant-current load, wherein said constant-current load and said amplifier transistor form a source-follower circuit.

34. A photoelectric conversion apparatus comprising:
a plurality of photoelectric conversion units arranged two-dimensionally, each photoelectric conversion unit comprising:
a photoelectric conversion portion adapted to receive a photo-signal from an object, convert the received photo-signal into an electric signal, and accumulate photo-charge,
an amplifier transistor adapted to amplify a signal from said photoelectric conversion portion and output the amplified signal, and
a reset transistor adapted to supply a reset signal to said photoelectric conversion portion, wherein a control electrode area of said amplifier transistor is connected to said photoelectric conversion portion without connection via a transistor;
a plurality of first accumulation units arranged two-dimensionally and correspondingly to respective ones of said plurality of photoelectric conversion units, and adapted to accumulate a signal from said photoelectric conversion portion of a respective one of said photoelectric conversion units;

a plurality of second accumulation units adapted to accumulate signals from said plurality of first accumulation units;

a common output line adapted to output sequentially the signals from said plurality of second accumulation units;

a drive circuit adapted to effect control so that during a time period in which the signals from said plurality of second accumulation units are output sequentially to said common output line, a signal which is generated due to reset of said photoelectric conversion portion at a first timing is stored in a capacitor of said first accumulation unit and accumulation of photo-charge is performed in said photoelectric conversion portion for a predetermined time, wherein the accumulation of photo-charge to be performed for the predetermined time is started when said photoelectric conversion portion is reset at the first timing; and a differential circuit adapted to perform a differential processing between the signal from said first accumulation unit, which is generated due to the reset of said photoelectric conversion portion at the first timing, and a signal generated by accumulating the photo-charge in said photoelectric conversion portion for the predetermined time after the reset at the first timing.

35. An apparatus according to claim 34, wherein each of said plurality of first accumulation units includes a read-out transistor adapted to amplify a signal in said control electrode area and output the amplified signal from a main electrode area.

36. An apparatus according to claim 34, further comprising a constant-current load, wherein said constant-current load and said amplifier transistor form a source-follower circuit.

37. An image pickup apparatus comprising:

a photo-converting cell including an amplifier for amplifying a signal generated in said photo-converting cell;

a drive circuit for resetting said photo-converting cell, then reading out a first noise signal from said photo-converting cell, then reading out a first image signal from said photo-converting cell, then resetting said photo-converting cell, then reading out a second noise signal, and then a second image signal from said photo-converting cell;

a first noise memory connected to said photo-converting cell for storing said second noise signal read out from said photo-converting cell; and a noise removing circuit for removing said first noise signal from said first image signal, wherein said noise removing circuit includes a second noise memory for storing said first noise signal while said second noise signal is stored in said first noise memory.

38. An apparatus according to claim 37, wherein said drive circuit resets said photo-converting cells by resetting a control electrode of said amplifier.

39. An apparatus according to claim 37, wherein said first noise memory is selectively connected to said second noise memory.

40. An apparatus according to claim 39, wherein a noise signal in said first noise memory is selectively transferred to said second noise memory.

41. An image pickup apparatus comprising:

a photo-converting cell including an amplifier for amplifying a signal generated in said photo-converting cell;

a drive circuit for resetting said photo-converting cell, then reading out a first noise signal from said photo-converting cell, then reading out an image signal from said photo-converting cell;

a noise removing circuit for carrying out a noise removing operation to remove said first noise signal from said image signal, wherein said noise removing circuit includes a memory for storing said first noise signal;

a buffer memory connected to said photo-converting cell for storing a second noise signal read out from said photo-converting cell while said noise removing operation by said noise removing circuit is carried out.

42. An apparatus according to claim 41, wherein said drive circuit resets said photo-converting cell by resetting a control electrode of said amplifier.

43. An apparatus according to claim 41, wherein said buffer memory is selectively connected to said memory.

44. An apparatus according to claim 43, wherein said second noise signal in said buffer memory is selectively transferred to said memory.

* * * * *

UNITED STATES PATENT AND TRADEMARK OFFICE
CERTIFICATE OF CORRECTION

PATENT NO. : 6,538,693 B1
DATED : March 25, 2003
INVENTOR(S) : Hiraku Kozuka

It is certified that error appears in the above-identified patent and that said Letters Patent is hereby corrected as shown below:

Title page,
Item [56], References Cited, U.S. PATENT DOCUMENTS,
"Kokuoka et al." should read -- Fokuoka et al. --.
FOREIGN PATENT DOCUMENTS,
"55104174" should read -- 55-104174 --;
"57140073" should read -- 57-140073 --;
"58111579" should read -- 58-111579 --;
"61219666" should read -- 61-219666 --; and
"1154678" should read -- 1-154678 --.

Column 1,
Lines 56 and 58, "$C_{bo}$" should read -- $C_{bc}$ --.

Column 5,
Line 31, "and-the" should read -- and the --; and
Lines 51 and 59, "Just" should read -- just --.

Column 6,
Line 35, "out-to" should read -- out to --.

Column 9,
Line 67, "transfer" should be deleted.

Signed and Sealed this

Sixteenth Day of December, 2003

JAMES E. ROGAN
*Director of the United States Patent and Trademark Office*